United States Patent Office 3,185,586
Patented May 25, 1965

3,185,586
COATED GLASS SHEETS
Arnold E. Saunders, Saxonburg, and William E. Wagner, Verona, Pa., assignors to Pittsburgh Plate Glass Company, Pittsburgh, Pa., a corporation of Pennsylvania
No Drawing. Filed Feb. 28, 1961, Ser. No. 92,169
15 Claims. (Cl. 117—54)

The present application is a continuation-in-part of application Serial No. 782,625, filed December 24, 1958, for Treating Glass Sheets and application Serial No. 852,209, filed November 12, 1959, for Treating Glass Sheets, both of which are now abandoned.

This application relates to coated glass sheets, and specifically covers a method of providing a refractory base with a metal oxide coating having improved optical uniformity compared to similar coatings of the prior art by applying one or more organo-metallic compounds capable of dissolving or of forming a colloidal suspension in an organic vehicle, particularly the 2-ethyl hexanoates, onto a heated surface of the base, and the articles produced by such treatment. The superior metal oxide coatings produced according to the present invention contain one or more metals from the class of metals whose 2-ethyl hexanoates either form colloidal suspensions or are soluble in organic solvents.

Suitable metal oxide films can be produced by applying a suitable organic metal compound in a suitable organic vehicle onto a surface of a heated glass sheet. On contact, the compound reacts to form a coating consisting essentially of the metal oxide. Much work has been done on obtaining films having heat-screening characteristics. The better heat screens of these films contain cobalt oxide as an essential ingredient. Other metal oxide films are employed for other desirable features. Tin oxide is both transparent and electroconductive, for example. The present invention suggests how to produce metal oxide films having superior texture and puts special emphasis on heat-screening coatings containing cobalt oxide. When such a coating is formed on a glass sheet, the resulting article is suitable for a glazing closure having lower heat transmisson properites than an uncoated sheet, since the coating serves as a heat screen for the coated portion of the article.

Films formed from cobalt acetate compositons tend to be spotty or grainy unless special precautions are taken in handling the film forming compositions containing the cobalt acetate before spraying them onto heated glass sheets. These precautions may require special boiling, stirring, and/or other treatments that result in either improving the solubility of the cobalt acetate or forming cobalt complexes which release cobalt ions readily on contacting a hot refractory surface and which are more readily soluble in the film forming composition than cobalt ions formed from inonization of cobalt acetate in solution. A typical treatment involving boiling cobalt acetate in alcohol followed by filtration is described and claimed in U.S. Patent application Serial No. 695,527 of Arnold E. Saunders and William E. Wagner, for Preparing Glass Coating Compositons, filed November 12, 1957. These special precautions are expensive and time consuming, but prior to the present invention have been considered necessary to improve the uniformity of the optical properties of the film formed.

Past experiments with inorganic cobalt salts have proved fruitless in obtaining coatings having the desired characteristics of uniformity, heat and light transmissivity and neutral color. Cobalt nitrate and perchlorate have been found to be suitable to form coatings, but the characteristics of these coatings are not suitable for transparent heat screens. Cobalt chloride, cobalt phosphate, cobalt iodide, and cobalt sulfate form powders rather than films on contacting hot glass surfaces.

The applications mentioned hereinabove from which the present application is derived disclose that a refractory base can be provided with a low transmission coating by heating the base to a temperature above about 400° F. but below the temperature at which the base melts, and contacting a hot surface of the base with a solvent containing dissolved therein an organic salt of cobalt taken from the class whose radicals contain at least 3 carbon atoms per molecule to form a film containing cobalt oxide as an essential ingredient on said surface. Similar organic compounds of other metals, for example, nickel, tin or iron, are employed as additives, where desired, to improve the durability of adhesion of the resulting film to the base.

Since many organic compounds of cobalt found suitable for use in such film forming are also useful as driers in the paint industry, they are readily available commercially. Cobalt compounds of the class employed maintain stability in solution so that the film forming composition containing organic cobalt salts in solution may be sprayed onto a heated glass surface to form a coating comprising cobalt oxide as an essential ingredient, without requiring the special precautions needed with cobalt acetate.

Among the organic cobalt compositions found most suitable to form films are cobalt stearate, cobalt benzoate, cobalt naphthalenate, cobalt propionate, cobalt ethoxypropionate, and cobalt 2-ethyl hexanoate. The latter has an alternative chemical nomenclature of cobalt 2-ethyl hexanoate and is commonly called cobalt "hexate," cobalt "octoate" or cobalt "octasol."

Other suitable organic cobalt compositions which formed films included cobalt linoresinate, cobalt oleate, and cobalt succinate.

The films formed by applying any of the organic cobalt compounds mentioned above are acceptable commercially for their decorative appearance. Some of the films are lacy in nature, and are acceptable for decorative purposes, while others are substantially uniform in appearance to the naked eye.

Cobalt 2-ethyl hexanoate, a derivative of 2-ethyl hexanoic acid, is the best cobalt containing filming composition of the many organic and inorganic salts of cobalt tested to produce films of homogeneous optical appearance free from spottiness or graininess without requiring any special pretreatment such as described above. Cobalt 2-ethyl hexanoate is preferred as the organic cobalt composition because of its superior film forming properties, solubility and stability of chemical composition even after standing for a considerable period. Metal oxide films formed from the 2-ethyl hexanoates of the corresponding metal or metals dissolved in an organic solvent have texture vastly superior to that of metal oxide films formed by applying other known compositions to a heated glass surface.

EXAMPLE I

Table I discloses the relative appearance of cobalt oxide films formed by spraying various commercially available cobalt compounds, all of which are suitable for use in compositions producing low heat and light transmission films when sprayed onto a heated surface of glass or other ceramic materials. Each of the films was produced by heating a sheet of polished plate glass ¼ inch thick to a surface temperature of about 1110° F. and spraying the heated sheet with one of the eleven organic cobalt compositions listed in Table I. The uniformity of appearance of each film was determined by visual observation and the films ranked accordingly in this table. Thus, Table I demonstrates that the naked eye finds films produced by applying cobalt 2-ethyl hexanoate superior in texture and uniformity of appearance to any other cobalt oxide film.

ing compositions with or without additional metal additives and treated by the method described in U.S. application Serial No. 695,527 of Arnold E. Saunders and

Table I

RELATIVE TEXTURE OF COBALT OXIDE FILMS PRODUCED BY DIFFERENT CARRIERS

| Cobalt carrier | Vehicle | Weight percent cobalt in vehicle | Uniformity of film appearance or texture | Rank of film texture quality |
|---|---|---|---|---|
| 2-ethyl hexanoate | Xylol | 6.0 | Good—No graininess | 1 |
| Acetate (boiled in alcohol) | 3A alcohol | 6.6 | Good—Trace of graininess | 2 |
| Acetate | Distilled water | 6.0 | Fair—Some graininess | 3 |
| Propionate | 3A alcohol | 6.6 | Fair—Slight graininess | 4 |
| B-ethoxy propionate | Xylol | 5.0 | ___do___ | 5 |
| Naphthenate | ___do___ | 6.0 | Poor—Grainy areas merging | 6 |
| Meletex (water dispersed naphthenate) | Water | 2.5 | ___do___ | 7 |
| Linoleate | Xylol | 5.0 | ___do___ | 8 |
| Linoresinate or tallate | ___do___ | 6.0 | ___do___ | 9 |
| Formate | Water | 1.5 | ___do___ | 10 |
| Oleate | Xylol | 5.0 | ___do___ | 11 |
| Chloride | Water | 40-50 | No film formed | |

Considerable confusion has arisen in the literature concerning the nomenclature of the 2-ethyl hexanoate radical. It also is called the octoate, octasol, and hexate. In order to avoid confusion, the 2-ethyl hexanoate or "octoate" as used herein refers to the following radical:

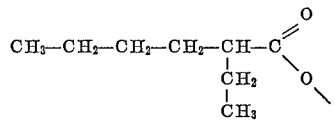

A technique has been developed for distinguishing heat-screening cobalt oxide containing coatings produced by applying onto a heated glass surface a composition containing cobalt 2-ethyl hexanoate with or without other metal additives from similar heat-screening cobalt oxide containing coatings produced by applying other organic cobalt compounds with or without other metal additives. This technique involves inspecting samples of glass sheets coated with various coatings under a microscope having a magnification of 18, and observing the field of vision of each sample under the microscope.

The microscopic investigation technique was employed in observing about one hundred samples provided with cobalt oxide containing coatings produced by spraying various organic filming compositions containing different organic cobalt compounds, such as cobalt acetate, cobalt formate, cobalt oleate, cobalt propionate, cobalt ethoxypropionate, cobalt naphthenate, and cobalt 2-ethyl hexanoate. Some of these samples also contained other metal organic compounds of the following additives: nickel, iron, and tin.

The coated samples mentioned hereinabove were produced under different conditions by a variety of personnel and at various times. The samples were a random sampling to determine whether the microscopic inspection technique could detect a difference between the cobalt oxide films produced by a cobalt 2-ethyl hexanoate composition and those produced by a different filming composition.

In every instance, the cobalt oxide containing films produced by spraying cobalt 2-ethyl hexanoate with or without metal additives displayed characteristics showing a marked difference from those of other cobalt oxide containing films produced by spraying other compounds containing equivalent concentrations of cobalt with or without other metals. The background of the view seen through the microscope was substantially uniform in intensity for the samples coated with 2-ethyl hexanoates and only very few dark spots appeared superimposed on the uniform field of view. In all other instances, except for films produced by spraying cobalt acetate film forming compositions with or without additional metal additives and treated by the method described in U.S. application Serial No. 695,527 of Arnold E. Saunders and William E. Wagner, filed November 12, 1957, the background of the film was not uniform.

The background of the cobalt oxide films with or without additional metal additives produced by the method described in said U.S. application Serial No. 695,527 also was superior in uniformity to those of other samples regardless of the presence or absence of metal additives. However, spots appearing in the field of view had colored halos which were not present in the films produced by applying cobalt 2-ethyl hexanoate.

From the criteria described above, an observer using a microscope can determine whether cobalt oxide films are produced by applying 2-ethyl hexanoate compositions or other materials. Cobalt oxide films produced from 2-ethyl hexanoate compositions are both free from halos and have a uniform background. Films from other materials do not have both these characteristics.

Solutions of organo-cobalt salts containing up to 12 percent by weight of cobalt based on the solution have been used to produce films of acceptable texture. However, cobalt 2-ethyl hexanoate containing 6 percent cobalt in an organic solvent has the requisite viscosity for spraying. Therefore, it atomizes better and provides a smoother texture than the same composition containing 12 percent by weight of cobalt based on the solution.

Any well-known organic solvent for metallic organic compounds, such as any aliphatic or aromatic compound capable of dissolving the organo-cobalt compositions used and sufficiently volatile for rapid evaporation at film forming temperature can be used as the solvent for the film forming compositions. Examples include aliphatic or aromatic alcohols, hydrocarbons, and halogenated hydrocarbon derivatives. Xylenes and aliphatic hydrocarbons have been used as solvents because the organo-cobalt salts used are available commercially dissolved in xylol or mineral spirits.

While the present invention is particularly concerned with coating glass of the soda-lime-silica type such as plate glass and drawn sheet glass, the invention also is applicable to coating other glassy substances, either transparent or opaque, which may serve as bases for the coatings. Borosilicate glass, barium crown glass, quartz, china, porcelain, mica, phopshate glass, lead X-ray glass, silicon carbide, flint glass, and various other refractory nonmetallic materials may be coated with coatings of the type depicted.

The adherence to a substrate of the cobalt oxide films produced by the application of any organic cobalt compound, particularly cobalt acetate or cobalt 2-ethyl hexanoate, is improved without substantial impairment of the light and heat-screening properties by the addition of a controlled amount by weight based on cobalt of the corresponding compound of nickel, iron or tin or mixtures thereof. Inclusion of up to about 100 percent by weight of nickel or of up to over 100 percent by weight of iron or of up to about 30 percent by weight of tin based on cobalt may be included in a two-element system containing cobalt as the basic ingredient without raising the total solar energy transmissivity to over 50 percent.

Particular triaxial compositions of the 2-ethyl hexanoates of cobalt, nickel, and tin or cobalt, nickel, and iron produce heat-screening films of superior adhesion to glass without substantially affecting the total solar energy transmission compared to films produced employing cobalt 2-ethyl hexanoate compositions described previously. This improvement in adhesion to the substrate is beneficial in employing these coatings in roof panels or enlarged glazing closures for automobiles and buildings.

Metal oxide films having superior adhesion properties composed predominantly of cobalt oxide in thicknesses of about 50 millimicrons have a light transmission coefficient less than 40 percent of total solar energy radiation. Such films are produced when glass sheets are coated by applying to their hot surfaces 2-ethyl hexanoate compositions containing about 6 percent by weight of metal based on the solution and between 8 percent and 20 percent by weight of nickel plus 2 percent to 20 percent of tin by weight or between about 2 percent to 20 percent of iron by weight based on cobalt in the case of triaxial systems of cobalt and nickel plus either tin or iron. If concentrations of nickel of about 10 percent by weight based on cobalt is included, the total solar energy transmissivity dropped to about 30 percent from about 35 percent for substantially pure cobalt oxide films. Small additions of iron oxide (about 2 percent) included in cobalt oxide films containing about 10 percent by weight of nickel based on cobalt also showed this surprising result of reducing the total solar energy transmissivity.

In order to have a quick test for the durability of the adherence of a film to a substrate, samples of various glass sheets coated with various films were half-way immersed in a 10 percent aqueous solution of trisodium phosphate ($Na_3PO_4 \cdot 12H_2O$). The samples were observed every 24 hours during the test periods which lasted 14 days. Any change in the general appearance of the film was noted.

EXAMPLE II

Glass sheet samples of a glass composition consisting essentially of the following parts by weight.

Glass composition:                Typical range, percent
  $SiO_2$—71.4% _____ 71–72
  $Na_2O$—13.11% (including about 0.5%
    $K_2O$ impurities) _____ 13.0–13.2
  $CaO$—11.67% _____ 11.6–11.8
  $MgO$—2.40% _____ 2.3–2.5
  $Na_2SO_4$—0.48% _____ 0.4–0.5
  $NaCl$—0.12% _____ 0.10–0.15
  $Al_2O_3$—0.19% (including about 0.02% to
    0.03% $TiO_2$ and about 0.01% $Zr_2O_3$
    impurities _____ 0.1–0.3
  $Fe_2O_3$—0.56% _____ 0.1–0.6 were heated in a muffle furnace maintained at a temperature of 1250° F. for a period of about four minutes. This heat treatment caused the surface of each glass sheet to reach a temperature in the range of 1100° F. to 1120° F. The samples were immediately removed from the furnace and sprayed with one of the test compositions containing one of the various mixtures of 2-ethyl hexanoates listed in the table below. The transmissivity through the samples was determined using a Beckman DK–2 spectrophotometer by measuring the intensity of a beam irradiated from a tungsten filament source and transmitted through the coated surface of a polished plate glass sample having a nominal thickness of ¼ inch at a 90 degree incident angle compared with the transmissivity of the beam through air, which was taken as 100 percent, at 10 millimicron intervals in the wave length band from 300 to 3,000 millimicrons and compensating the output of the tungsten filament source to that of the sun for each reading before calculating the total solar energy transmittance through the coated thickness of each sample tested.

The samples were then tested by immersion of half of each sample in a 10 percent aqueous solution of $Na_3PO_4 \cdot 12H_2O$. The films were evaluated daily every day for a period of 10 to 14 days for a change in the visual appearance of the film, unless the film failed completely in a shorter period. Table II below indicates the total solar energy transmissivity and durability of the adherence to glass of the various cobalt oxide films produced by spraying the filming compositions indicated in the table and then exposing half of each coated samples by immersion to sodium phosphate solution.

Table II

STUDY OF FILMS FROM METAL 2-ETHYL HEXANOATE COMPOSITIONS

| | Weight percent of metal in filming composition | | | | Total solar energy transmissivity of film, percent | Results after exposure to sodium phosphate |
|---|---|---|---|---|---|---|
| | Cobalt | Nickel | Tin | Iron | | |
| 1 | 6 | | | | 35.8 | Complete failure 7 days. |
| 2 | 5.4 | 0.6 | | | 29.5 | Complete failure 9 days. |
| 3 | 4.5 | 1.5 | | | (*) | Light edge attack after 14 days. |
| 4 | 3.0 | 3.0 | | | 49.7 | Good after 14 days. |
| 5 | 5.16 | 0.51 | 0.70 | | 36.1, 37.1, 41.1 | Good after 11 days. |
| 6 | 4.8 | 0.6 | 2.8 | | (*) | Good after 14 days. |
| 7 | 3.6 | 1.2 | 5.6 | | (*) | Do. |
| 8 | 2.0 | 2.0 | 9.3 | | (*) | Do. |
| 9 | 1.2 | 2.4 | 11.2 | | (*) | Do. |
| 10 | | | 3.0 | 14.0 | (*) | Do. |
| 11 | 4.5 | | 7.0 | | (*) | Do. |
| 12 | 3.0 | | 14.0 | | 66.2 | Do. |
| 13 | 5.4 | | | 0.6 | (*) | Failed in 14 days. |
| 14 | 5.34 | 0.54 | | 0.12 | 30.0 | Failed in 9 days. |
| 15 | 4.5 | | | 1.5 | (*) | Light edge attack after 14 days. |

*Not measured.

EXAMPLE III

Various samples of polished plate glass 12 x 12 x ¼ inch were individually heated for about 2½ minutes in a muffle furnace maintained at about 1250° F. This was sufficient time to raise the surface temperature to about 1110° F. The heated sheet was removed from the furnace and immediately after heating sprayed with one of the metal 2-ethyl hexanoate compositions listed in Table III below. In each instance, 10 cubic centimeters of filming composition was applied to the heated glass sheet in a period of 10 seconds. Some of the samples were reheated after being filmed. The reheating involved an identical heating cycle to that which preceded the spraying step.

The filmed articles were exposed to a 4 percent salt spray atmosphere and periodically inspected for indications of non-uniformity of film appearance, which was attributed to deterioration of the bond between the film and the glass. There were four to six samples in each of the six categories tabulated. The average number of hours of exposure of the samples in each category to the salt spray before an observable weakening of the bond is tabulated in Table III.

Table III

| Metal concentration of filming composition, percent | | | | Average exposure time before obving indication of film removal, hours | |
|---|---|---|---|---|---|
| Cobalt | Nickel | Tin | Iron | Single fired | Double fired |
| 5.4 | 0.6 | ---- | ---- | 73 | 786 |
| 5.34 | 0.54 | ---- | 0.12 | 316 | 1,009 |
| 5.16 | 0.51 | 0.70 | ---- | 826 | 781 |

This test indicated the superior adhesion of cobalt oxide films to glass in the salt spray when nickel and tin or nickel and iron are incorporated in the filming composition or when the coated article is subjected to a second heating operation after the coating is applied.

EXAMPLE IV

Sixty glass sheets were divided into three groups of twenty each and treated in the manner indicated in Example III. Each group of 20 glass sheets was coated with a different coating composition from the 3 compositions used for filming the samples for Example III. After 6 to 8 months of exposure to the weather there was no visual notice of film failure among any of the 60 films.

The substantial freedom from graininess of cobalt oxide films resulting from applying the 2-ethyl hexanoate filming compositions that is readily apparent under microscopic examination also furnishes a basis for distinguishing other metal oxides produced by applying 2-ethyl hexanoate filming compositions of the metal in question from the equivalent metal oxides produced by applying other filming compositions of said metal.

In all instances of the many metal oxide coatings inspected under the microscope, those produced by the 2-ethyl hexanoate filming compositions were characterized by both a uniform background and freedom from halos. The metal oxide coatings produced by applying other filming compositions either had a non-uniform background and/or showed halos superimposed on the background when inspected under a microscope of 18 magnification. This characteristic enabled the Analytical Department of applicants' assignee to develop a nondestructive discriminatory test to determine whether the 2-ethyl hexanoate or some other filming composition was employed in producing the coating.

EXAMPLE V

Various samples of metal oxide films were prepared by heating glass sheets in the manner described in Example III, and applying various filming compositions to the glass sheets to form films having a thickness in the range of 50 to 80 millimicrons. The results of their inspection under the microscope and the total solar energy transmissivity of the various coatings is reported in Table IV, which follows:

Table IV

| Metal and its weight concentration | Carrier (Organic Radical) | Total solar energy transmissivity, percent | Appearance under Microscope | |
|---|---|---|---|---|
| | | | Background | Halos |
| 6% Co | 2-ethyl hexanoate | 35.8 | Uniform | No. |
| 28% Sn | do | 67.6 | do | No. |
| 6% Cr | do | 68.5 | do | No. |
| 6% Ni | do | 59.0 | do | No. |
| 6% Cu | do | 39.8 | do | No. |
| 6% Fe | do | 50.3 | Uniform (with pale orange spots). | No. |
| 6% Mn | do | 57.4 | Uniform | No. |
| 10% Bi | do | 57.7 | do | No. |
| 24% Pb | do | 71.0 | do | No. |
| 8% Zn | do | 73.6 | do | No. |
| 5.4% Co; 0.6% Ni | do | 29.5 | do | No. |
| 3% Co; 3% Ni | do | 49.7 | do | No. |
| 3% Co; 3% Fe | do | 45.5 | do | No. |
| 3% Co; 3% Cr | do | 56.4 | do | No. |
| 3% Co; 14% Sn | do | 66.2 | do | No. |
| 3% Ni; 14% Sn | do | 65.3 | do | No. |
| 3% Ni; 3% Fe | do | 51.0 | do | No. |
| 2.7% Co; 2.7% Ni; 0.6% Cr | do | 41.2 | do | No. |
| 3.6% Co; 1.2% Ni; 1.2% Cr | do | 40.7 | do | No. |
| 1.8% Co; 1.8% Ni; 2.4% Fe | do | 40.9 | do | No. |
| 5.34% Co; 0.54% Ni; 0.12% Fe | do | 30.0 | do | No. |
| 0.6% Co; 5.4% Ni | do | 57.9 | do | No. |
| 1.5% Co; 4.5% Ni | do | 57.0 | do | No. |
| 5.16% Co; 0.51% Ni; 0.7% Sn | do | 36.1, 37.0, 41.1 | do | No. |
| 5.16% Co; 0.51% Ni; 0.7% Sn | do | 36.1, 37.0, 41.1 | do | No. |
| 5.16% Co; 0.51% Ni; 0.7% Sn | do | 36.1, 37.0, 41.1 | do | No. |
| 6.6% Co | Acetate (treated) | *41 | do | Yes. |
| 6.6% Co | Propionate | *41 | Mottled | No. |
| 5% Co | B-ethoxy propionate | *46 | do | No. |
| 8.3% Cu | Propionate | *40 | Dark, finely mottled | No. |
| 8.7% Cu | B-ethoxy propionate | *38 | Mottled and grainy | No. |
| 3.1% Fe | Propionate | *62 | Orange spots, grainy, mottled. | No. |
| 3.8% Fe | B-ethoxy propionate | *80 | Orange spots, grainy, mottled. | No. |
| 5.3% Mn | Propionate | *68 | Very large grains, mottled. | No. |
| 6% Au | Lauryl mercaptide | 30.6 | Small purple particles non-uniform. | No. |
| 3.6% V | 2-ethyl hexanoate | *70 | Uniform yellowish film. | No. |
| 3% Co; 1.5% Cr; 0.9% V | do | *70 | Uniform yellow-green film. | No. |

*Transmittance of luminous light only determined by a light meter.

The total solar energy transmissivity of uncoated glass was 76.7 percent for a ¼ inch thick sample.

From Table IV above, it is obvious that metal oxide films, such as oxides of copper, zinc, zirconium, cerium, manganese, tin, vanadium, bismuth, lead, chromium, cobalt, nickel, and iron, and mixtures thereof may be produced by spraying a colloidal suspension of one or more appropriate organo-metal salts onto a surface of a heated refractory base. The resulting films are similar in chemical composition to those found in prior art metal oxide films. However, metal oxide films resulting from applying metal 2-ethyl hexanoates are more uniform and freer from thickened areas than films produced by prior art techniques. The orange spots appearing in iron oxide films produced from the respective 2-ethyl hexanoates were visible under the microscope, but not visible to the naked eye even when viewed through a viewing screen.

It is believed that the superiority of 2-ethyl hexanoate filming compositions to produce metal oxide films results from the fact that these compositions either form colloidal suspensions or are soluble in the organic vehicle used in the filming compositions.

Several examples of coating compositions, methods of application, and the resulting filmed articles have been described hereinabove for the purpose of illustration rather than limitation. Many variations from the illustrative examples recited above will become obvious in the light of the foregoing disclosure and are intended to be encompassed within the claimed subject matter which follows.

What is claimed is:

1. A method of providing a transparent glass sheet with a metal oxide coating substantially free from graininess and characterized by a uniform background and free from halos when inspected through a microscope having a magnification of 18, which comprises heating said sheet to a temperature above about 400° F. but below the temperature at which the glass melts, and contacting a hot surface thereof with a composition containing an organic vehicle containing therein a metal 2-ethyl hexanoate selected from the group consisting of compounds capable of being dissolved in said vehicle and compounds capable of forming a colloidal suspension therein to form a film containing metal oxide as an essential ingredient on said surface.

2. A method according to claim 1, wherein the glass is a soda-lime-silica glass.

3. A method according to claim 1, wherein the coated sheet is reheated after it is coated in substantially the same manner as it was heated before forming the film, said reheating being performed subsequent to the contact of said hot glass surface with said composition.

4. A method of providing a transparent glass sheet with a low heat and light transmission coating substantially free of graininess and characterized by a uniform background and free from halos when inspected through a microscope having a magnification of 18 which comprises heating said sheet to a temperature above about 400° F. but below the temperature at which the glass melts, and contacting a hot surface thereof with a composition containing an organic vehicle containing therein cobalt 2-ethyl hexanoate to form a film containing cobalt oxide as an essential ingredient on said surface.

5. A method according to claim 4, wherein the coated glass sheet is reheated after it is coated in substantially the same manner as it was heated before forming the film, said reheating being performed subsequent to the contact of said hot glass surface with said composition.

6. A method according to claim 4, wherein the composition further contains an organic salt of a metal selected from the group consisting of nickel, iron, tin and mixtures thereof.

7. A method according to claim 6, wherein the concentration of metal in said organic salt does not exceed 100 percent by weight of nickel, 40 percent by weight of tin and 100 percent by weight of iron based on cobalt.

8. A method according to claim 4, wherein the composition consists essentially of an organic solution of cobalt 2-ethyl hexanoate containing up to 12 percent cobalt by weight based on the solution and an organic salt of nickel containing substantially 10 percent by weight of nickel based on cobalt.

9. A method according to claim 4, wherein the composition consists essentially of cobalt 2-ethyl hexanoate and an organic salt of nickel, the concentration by weight of nickel based on cobalt being about 10 percent and the concentration by weight of metal based on the solution being about 6 percent.

10. A method according to claim 4, wherein the composition consists essentially of cobalt 2-ethyl hexanoate containing up to 12 percent by weight of cobalt based on the solution and additional organic metal salts including a substantially lesser amount of an organic nickel salt and at least one other organic salt of a metal selected from the group consisting of tin and iron.

11. A method according to claim 10, wherein the metal content of said additional organic metal salts by weight based on cobalt is 8 to 20 percent of nickel, plus 2 to 20 percent of a metal from said group of metals.

12. A method according to claim 4, wherein said composition contains about 6 percent by weight of metal based on said composition and consisting essentially of about 89 percent cobalt, about 9 percent nickel, and about 2 percent iron by weight based on said metals.

13. A method according to claim 12 wherein said coated glass sheet is reheated after it is coated in substantially the same manner as it was heated before forming the film, said reheating being performed subsequent to the contact of said hot glass surface with said composition.

14. A method according to claim 4, wherein said composition contains about 5.16 percent by weight of cobalt, about 0.51 percent by weight of nickel, and about 0.7 percent by weight of tin based on said composition.

15. As an article of manufacture, a product prepared in accordance with the method of claim 1.

References Cited by the Examiner

UNITED STATES PATENTS

| | | | |
|---|---|---|---|
| 2,584,041 | 1/52 | Nowak et al. | 260—439 X |
| 2,584,763 | 2/52 | Waggoner | 117—126 |
| 2,593,817 | 4/52 | Waggoner | 117—126 |
| 2,617,741 | 11/52 | Lytle | 117—211 |
| 2,651,585 | 9/53 | Lytle et al. | 117—211 |
| 2,688,565 | 9/54 | Raymond | 117—35 |
| 2,694,649 | 11/54 | Tarnopol | 117—211 |
| 2,754,221 | 7/56 | Caroselli | 117—126 |
| 2,754,224 | 7/56 | Caroselli | 117—126 |
| 3,004,875 | 10/61 | Lytle | 117—124 |
| 3,019,136 | 1/62 | Auffenorde et al. | 117—261 |

RICHARD D. NEVIUS, *Primary Examiner.*